(12) United States Patent
Brooks

(10) Patent No.: US 10,031,153 B2
(45) Date of Patent: Jul. 24, 2018

(54) MAGNETIC RANGING TO AN AC SOURCE WHILE ROTATING

(71) Applicant: Schlumberger Technology Corporation, Sugar Land, TX (US)

(72) Inventor: Andrew Brooks, Tomball, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 602 days.

(21) Appl. No.: 14/318,372

(22) Filed: Jun. 27, 2014

(65) Prior Publication Data

US 2015/0378044 A1    Dec. 31, 2015

(51) Int. Cl.
| | |
|---|---|
| G01V 3/00 | (2006.01) |
| G01P 15/00 | (2006.01) |
| E21B 47/022 | (2012.01) |
| E21B 7/06 | (2006.01) |
| G01V 3/28 | (2006.01) |

(52) U.S. Cl.
CPC .............. *G01P 15/00* (2013.01); *E21B 7/06* (2013.01); *E21B 47/02216* (2013.01); *G01V 3/28* (2013.01)

(58) Field of Classification Search
CPC .............. G01V 3/18; G01V 3/34; G01V 3/38
USPC ........................ 324/346, 333, 334, 338, 339
See application file for complete search history.

(56) References Cited

U.S. PATENT DOCUMENTS

| | | | |
|---|---|---|---|
| 2,596,322 A | 5/1952 | Zumwalt | |
| 2,980,850 A | 4/1961 | Cochran | |
| 3,117,065 A | 1/1964 | Wootten | |
| 3,406,766 A | 10/1968 | Henderson | |
| 3,670,185 A | 6/1972 | Vermette | |
| 3,673,629 A | 7/1972 | Casey et al. | |
| 3,725,777 A | 4/1973 | Robinson et al. | |
| 3,731,752 A | 5/1973 | Schad | |
| 3,862,499 A | 1/1975 | Isham et al. | |
| 4,072,200 A | 2/1978 | Morris et al. | |
| 4,458,767 A | 7/1984 | Hoehn, Jr. | |
| 4,465,140 A | 8/1984 | Hoehn, Jr. | |
| 4,525,715 A * | 6/1985 | Smith ................... | E21B 47/122 |
| | | | 175/50 |
| 4,646,277 A | 2/1987 | Bridges et al. | |
| 4,672,345 A | 6/1987 | Littwin et al. | |
| 4,710,708 A | 12/1987 | Rorden et al. | |
| 4,730,230 A | 3/1988 | Helfrick et al. | |

(Continued)

FOREIGN PATENT DOCUMENTS

| | | |
|---|---|---|
| WO | 2012134468 A1 | 10/2012 |
| WO | 2013101587 A1 | 7/2013 |

OTHER PUBLICATIONS

International Search Report issued in related PCT application PCT/US2015/037875 dated Sep. 9, 2015, 3 pages.

(Continued)

*Primary Examiner* — Giovanni Astacio-Oquendo

(57) ABSTRACT

A method for magnetic ranging includes rotating a downhole tool in a drilling well in sensory range of magnetic flux emanating from a target well having an AC magnetic source deployed therein. The downhole tool includes a magnetic field sensor deployed therein. The magnetic field sensor measures a magnetic field vector while rotating. The measured magnetic field vector is processed to compute at least one of a distance and a direction from a drilling well to a target well.

24 Claims, 6 Drawing Sheets

(56) References Cited

U.S. PATENT DOCUMENTS

| | | | |
|---|---|---|---|
| 4,743,849 A | 5/1988 | Novikov | |
| 4,812,812 A | 3/1989 | Flowerdew et al. | |
| 4,813,274 A | 3/1989 | DiPersio et al. | |
| 4,894,923 A | 1/1990 | Cobern et al. | |
| 4,931,760 A | 5/1990 | Yamaguchi et al. | |
| 4,933,640 A | 6/1990 | Kuckes | |
| 5,012,412 A | 4/1991 | Helm | |
| 5,025,240 A | 6/1991 | La Croix | |
| 5,126,720 A | 6/1992 | Zhou et al. | |
| 5,148,869 A | 9/1992 | Sanchez et al. | |
| 5,230,387 A | 7/1993 | Waters et al. | |
| 5,319,335 A | 6/1994 | Huang et al. | |
| 5,428,332 A | 6/1995 | Srail et al. | |
| 5,485,089 A | 1/1996 | Kuckes | |
| 5,512,830 A | 4/1996 | Kuckes | |
| 5,541,517 A | 7/1996 | Hartmann et al. | |
| 5,589,775 A | 12/1996 | Kuckes | |
| 5,657,826 A | 8/1997 | Kuckes | |
| 5,675,488 A | 10/1997 | McElhinney | |
| 5,725,059 A | 3/1998 | Kuckes et al. | |
| 5,923,170 A | 7/1999 | Kuckes | |
| RE36,569 E | 2/2000 | Kuckes | |
| 6,060,970 A | 5/2000 | Bell | |
| 6,310,532 B1 | 10/2001 | Santa Cruz et al. | |
| 6,369,679 B1 | 4/2002 | Cloutier et al. | |
| 6,466,020 B2 | 10/2002 | Kuckes et al. | |
| 6,670,806 B2 | 12/2003 | Wendt et al. | |
| 6,698,516 B2 | 3/2004 | Van Steenwyk et al. | |
| 6,736,222 B2 | 5/2004 | Kuckes et al. | |
| 6,937,023 B2 | 8/2005 | McElhinney | |
| 6,985,814 B2 | 1/2006 | McElhinney | |
| 6,991,045 B2 | 1/2006 | Vinegar et al. | |
| 7,510,030 B2 | 3/2009 | Kuckes et al. | |
| 7,538,650 B2 | 5/2009 | Stenerson et al. | |
| 7,565,161 B2 | 7/2009 | Sliva | |
| 7,568,532 B2 | 8/2009 | Kuckes | |
| 7,617,049 B2 | 11/2009 | McElhinney et al. | |
| 7,650,269 B2 | 1/2010 | Rodney | |
| 7,656,161 B2 | 2/2010 | McElhinney | |
| 7,671,049 B2 | 3/2010 | Desai et al. | |
| 7,712,519 B2 | 5/2010 | McElhinney et al. | |
| 7,755,361 B2 * | 7/2010 | Seydoux | G01V 3/28 324/333 |
| 8,010,290 B2 | 8/2011 | Illfelder | |
| 8,026,722 B2 | 9/2011 | McElhinney | |
| 8,049,508 B2 * | 11/2011 | Gorek | G01V 3/28 324/338 |
| 8,490,717 B2 | 7/2013 | Bergstrom et al. | |
| 2002/0062992 A1 | 5/2002 | Fredericks et al. | |
| 2003/0188891 A1 | 10/2003 | Kuckes | |
| 2004/0051610 A1 | 3/2004 | Sajan | |
| 2004/0119607 A1 | 6/2004 | Davies et al. | |
| 2004/0263300 A1 | 12/2004 | Maurer et al. | |
| 2006/0106587 A1 | 5/2006 | Rodney | |
| 2006/0131013 A1 | 6/2006 | McElhinney | |
| 2007/0203651 A1 | 8/2007 | Blanz et al. | |
| 2007/0289373 A1 * | 12/2007 | Sugiura | E21B 7/062 73/152.46 |
| 2008/0177475 A1 | 7/2008 | McElhinney | |
| 2010/0126770 A1 * | 5/2010 | Sugiura | E21B 7/062 175/38 |
| 2010/0155139 A1 | 6/2010 | Kuckes | |
| 2010/0250207 A1 | 9/2010 | Rodney | |
| 2011/0036631 A1 * | 2/2011 | Prill | E21B 7/06 175/57 |
| 2011/0133741 A1 | 6/2011 | Clark | |
| 2011/0282583 A1 | 11/2011 | Clark | |
| 2011/0298462 A1 | 12/2011 | Clark et al. | |
| 2012/0194195 A1 | 8/2012 | Wisler et al. | |
| 2013/0069655 A1 | 3/2013 | McElhinney et al. | |
| 2013/0073208 A1 * | 3/2013 | Dorovsky | G01V 3/26 702/11 |
| 2013/0151158 A1 | 6/2013 | Brooks et al. | |
| 2014/0111210 A1 | 4/2014 | Fang et al. | |

OTHER PUBLICATIONS

International Search Report issued in related PCT application PCT/US2015/037884 dated Sep. 21, 2015, 3 pages.

Ex Parte Quayle Action issued in U.S. Appl. No. 14/318,327 on Jun. 16, 2017. 7 pages.

International Preliminary Report on Patentability issued in related PCT application PCT/US2015/037884 dated Jan. 5, 2017. 11 pages.

International Preliminary Report on Patentability issued in related PCT application PCT/US2015/037875 dated Jan. 5, 2017. 7 pages.

* cited by examiner

MAGNETIC RANGING TO AN AC SOURCE WHILE ROTATING

CROSS REFERENCE TO RELATED APPLICATIONS

None.

FIELD OF THE DISCLOSURE

Disclosed embodiments relate generally to magnetic ranging methods and more particularly to methods for magnetic ranging while drilling (i.e., while the drill string is rotating).

BACKGROUND INFORMATION

In subterranean drilling operations the need frequently arises to determine the relative location of the wellbore being drilled (the drilling well) with respect to a pre-existing offset wellbore (a target well). This need may exist for the purpose of avoiding a collision or making an interception, or for the purpose of maintaining a specified separation distance between the wells (e.g., as in well twinning operations such as steam assisted gravity drainage operations). Magnetic ranging techniques are commonly employed to determine the relative location of the target well, for example, by making magnetic field measurements in the drilling well. The measured magnetic field may be induced in part by ferromagnetic material or an electromagnetic source (or sources) in the target well such that the measured magnetic field vector may enable the relative location of the target well to be computed.

Existing magnetic ranging techniques are similar to conventional static surveys in that they require drilling to be halted and the drill string to be held stationary in the drilling well while each magnetic survey is obtained. Magnetic ranging operations are therefore costly and time consuming. Moreover, magnetic ranging is similar to wellbore navigation in that the well path may be continuously adjusted in response to the ranging measurements. It may therefore be desirable to make ranging measurements as close to the bit as possible, in order to gain the earliest possible notification of required course adjustments. Owing to the rotation of the bit, measurements made close to the bit while drilling are made from a rotating platform (i.e., with rotating magnetic field sensors). There is a need in the art for magnetic ranging methods that employ magnetic field measurements made from a rotating platform (rotating sensors).

SUMMARY

A method for magnetic ranging is disclosed. A downhole drilling tool is rotated in a drilling well in sensory range of magnetic flux emanating from a target well having an AC magnetic source deployed therein. The downhole tool includes a magnetic field sensor deployed therein. The magnetic field sensor measures a magnetic field vector while rotating. The measured magnetic field vector is processed to compute at least one of a distance and a direction from a drilling well to a target well.

The disclosed methods may enable magnetic ranging measurements to be acquired and processed while rotating the magnetic field sensors in the drilling well. The measurements may therefore be acquired and processed while drilling. Moreover, in embodiments in which the magnetic field sensors are mounted in a near-bit sensor sub below a mud motor, the ranging measurements may be acquired and processed while maintaining drilling fluid circulation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
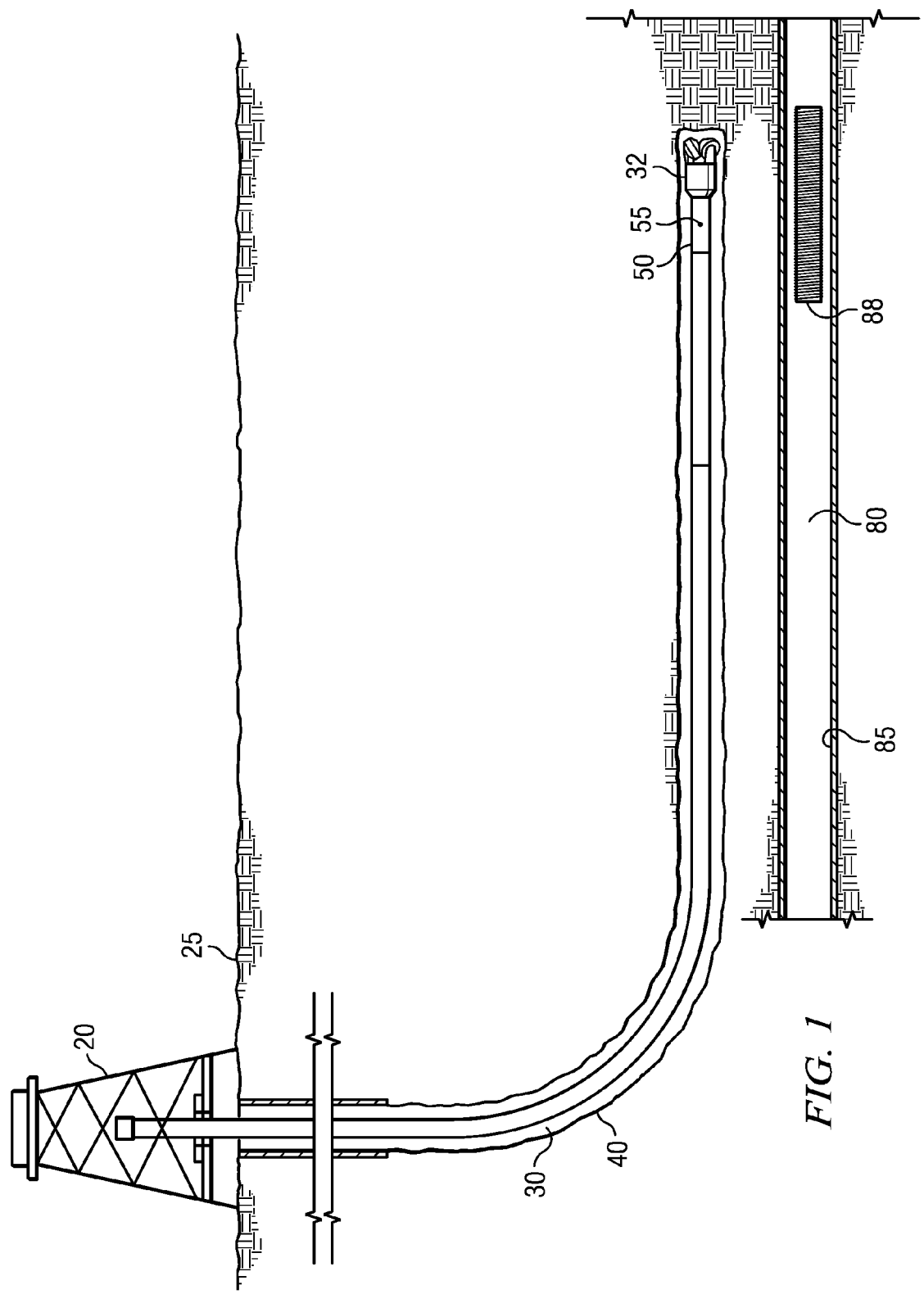
FIG. 1 depicts one example of a conventional drilling rig and a target wellbore with which disclosed methods may be utilized.

FIG. 1 depicts a drilling rig 20 suitable for using various method embodiments disclosed herein. The rig may be positioned over an oil or gas formation (not shown) disposed below the surface of the Earth 25. The rig 20 may include a derrick and a hoisting apparatus for raising and lowering a drill string 30, which, as shown, extends into wellbore 40 and includes a drill bit 32 and a near-bit sensor sub 50 (such as the iPZIG® tool available from PathFinder®, A Schlumberger Company, Katy, Tex., USA). Drill string 30 may further include a downhole drilling motor, a steering tool such as a rotary steerable tool, a downhole telemetry system, and one or more MWD or LWD tools including various sensors for sensing downhole characteristics of the borehole and the surrounding formation. The disclosed embodiments are not limited in these regards.

FIG. 1 further depicts a well twinning operation, such as a steam assisted gravity drainage (SAGD) operation, in which various disclosed method embodiments may be utilized. In common SAGD well twinning operations a horizontal twin well 40 is drilled a substantially fixed distance above a horizontal portion of a target wellbore 80 (e.g., not deviating more than about 1 meter up or down or to the left or right of the target). In the depicted embodiment the target well 80 is drilled first, for example, using conventional directional drilling and MWD techniques. The target wellbore 80 may be magnetized, for example, via installing a plurality of premagnetized tubulars 85 in the wellbore or deploying a magnetic source 88 such as a DC or an AC electromagnet in the wellbore. Magnetic field measurements made while the drill string 30 rotates in the drilling well 40 (e.g., at sensor sub 50) may then be used to determine a relative distance and direction from the drilling well 40 to the target well 30 (as described in more detail below).

It will be understood by those of ordinary skill in the art that the deployment illustrated on FIG. 1 is merely an example. For example, while FIG. 1 depicts a SAGD operation, the disclosed embodiments are in no way limited to SAGD or other well twinning operations, but may be used in substantially any drilling operation in which it is desirable to determine the relative location of the drilling well with respect to an offset well. Such operations may be performed onshore (as depicted) or offshore.

Figure 2:
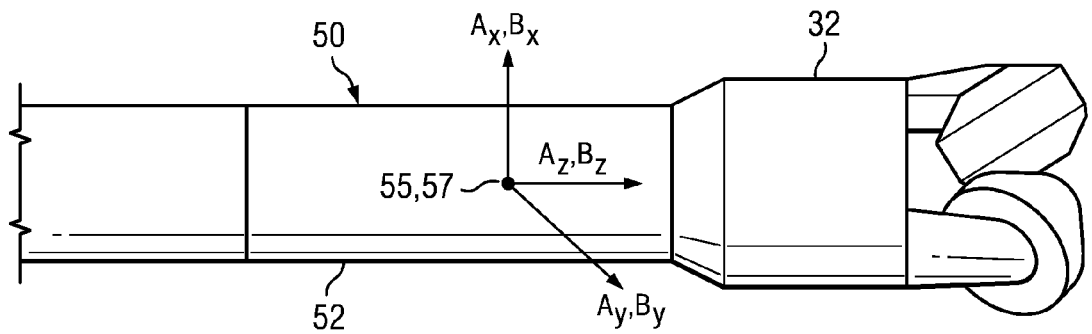
FIG. 2 depicts a lower BHA portion of the drill string shown on FIG. 1.

FIG. 2 depicts the lower BHA portion of drill string 30 including drill bit 32 and near-bit sensor sub 50. In the depicted embodiment, sensor sub body 52 is threadably connected with the drill bit 32 and therefore configured to rotate with the bit 32. The depicted sensor sub 50 includes a tri-axial (three axis) accelerometer set 55 and a tri-axial magnetometer set 57. In the depicted embodiment, the sensors 55 and 57 being deployed in a near-bit sensor sub may be deployed close to the drill bit 32, for example, within two meters, or even within one meter of the bit 32. However, it will be understood that the disclosed embodiments are not limited to the use of a near-bit sensor sub or to the deployment of the sensor close to the bit. Substantially any suitable measurement tool (such as a conventional MWD tool) including a magnetic field sensor may be utilized.

Suitable accelerometers and magnetometers for use in sensors 55 and 57 may be chosen from among any suitable commercially available devices known in the art. For example, suitable accelerometers may include Part Number 979-0273-001 commercially available from Honeywell, and Part Number JA-5H175-1 commercially available from Japan Aviation Electronics Industry, Ltd. (JAE). Other suitable accelerometers may include micro-electro-mechanical systems (MEMS) solid-state accelerometers, available, for example, from Analog Devices, Inc. (Norwood, Mass.). Such MEMS accelerometers may be advantageous for certain near bit sensor sub applications since they tend to be shock resistant, high-temperature rated, and inexpensive. Suitable magnetic field sensors may include conventional ring core flux gate magnetometers or conventional magnetoresistive sensors, for example, Part Number HMC-1021D, available from Honeywell.

FIG. 2 further includes a diagrammatic representation of the tri-axial accelerometer and tri-axial magnetometer sensor sets 55 and 67. By tri-axial it is meant that each sensor set includes three mutually perpendicular sensors, the accelerometers being designated as $A_x$, $A_y$, and $A_z$ and the magnetometers being designated as $B_x$, $B_y$, and $B_z$. By convention, a right handed system is designated in which the z-axis accelerometer and magnetometer ($A_z$ and $B_z$) are oriented substantially parallel with the borehole as indicated (although disclosed embodiments are not limited by such conventions). Each of the accelerometer and magnetometer sets may therefore be considered as determining a transverse cross-axial plane (the x and y-axes) and an axial pole (the z-axis along the axis of the BHA).

By further convention, the gravitational field is taken to be positive pointing downward (i.e., toward the center of the Earth) while the magnetic field is taken to be positive pointing towards magnetic north. Moreover, also by convention, the y-axis is taken to be the toolface reference axis (i.e., gravity toolface T equals zero when the y-axis is uppermost and magnetic toolface M equals zero when the y-axis is pointing towards the projection of magnetic north in the transverse (xy) plane). Those of ordinary skill in the art will readily appreciate that the magnetic toolface M is projected in the xy plane and may be represented mathematically as: $\tan M = B_x/B_y$. Likewise, the gravity toolface T may be represented mathematically as: $\tan T = -A_x/-A_y$. Those of skill in the art will understand that the negative sign in the gravity toolface expression arises owing to the convention that the gravity vector is positive in the downward direction while the toolface reference direction is the high side of the borehole (the side facing upward).

It will be understood that the disclosed embodiments are not limited to the above described conventions for defining the borehole coordinate system. It will be further understood that these conventions can affect the form of certain of the mathematical equations that follow in this disclosure. Those of ordinary skill in the art will be readily able to utilize other conventions and derive equivalent mathematical equations.

Figure 3:
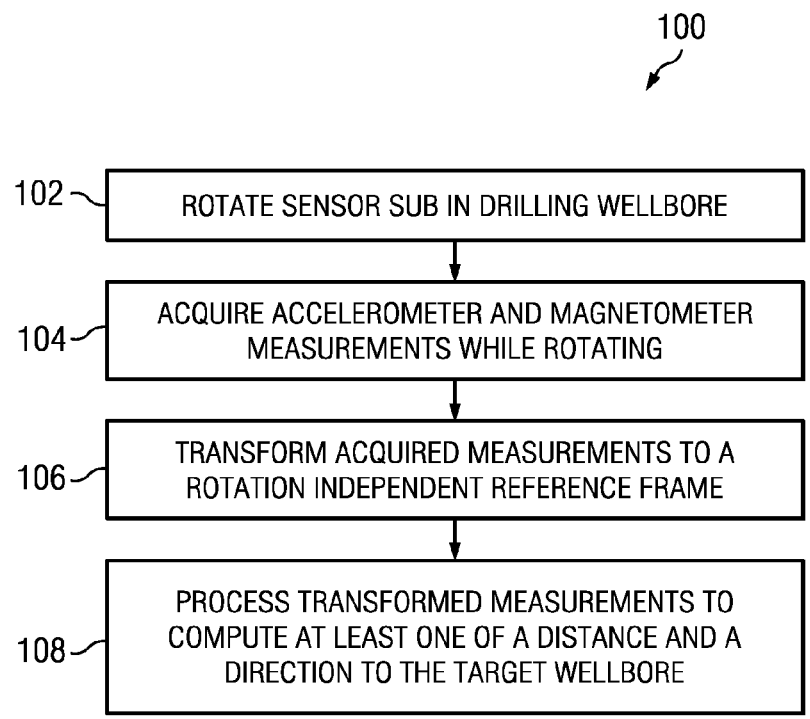
FIG. 3 depicts a flow chart of one disclosed method embodiment.

FIG. 3 depicts a flow chart of one disclosed method embodiment 100. A sensor sub (e.g., sub 50) including accelerometers and magnetometers is rotated in a drilling well at 102 in sensory range of magnetic flux emanating from a target wellbore. Accelerometer and magnetometer measurements are acquired at 104 while rotating in 102. The acquired transverse magnetometer measurements may be transformed at 106 to a reference frame that is independent of the sensor rotation in 102. The transformed measurements may then be processed at 108 to compute at least one of a distance and a direction from the drilling well to the target well.

Figure 4:
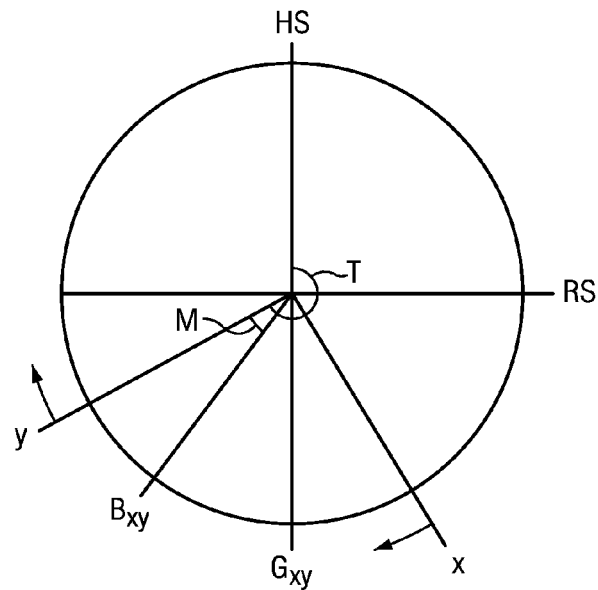
FIG. 4 depicts a schematic of the measured magnetic field in the transverse plane.

During rotation at 102, the transverse sensor (accelerometers $A_x$ and $A_y$ and magnetometers $B_x$ and $B_y$) measurements may be expressed mathematically, for example, as follows:

$$A_x = -A_{xy} \cdot \sin T \tag{1}$$

$$A_y = -A_{xy} \cdot \cos T \tag{2}$$

$$B_x = B_{xy} \cdot \sin M \tag{3}$$

$$B_y = B_{xy} \cdot \cos M \tag{4}$$

where $A_{xy}$ represents the transverse component of the acceleration (e.g., due to gravity), $B_{xy}$ represents the transverse component of the magnetic field, and T and M represent gravity and magnetic tool face as defined above. With reference to FIG. 4, recognizing that the toolface offset angle T−M is independent of rotation (toolface offset depends on the wellbore attitude and the magnetic dip angle) enables the transverse measurements to be transformed into a reference frame that is independent of the rotation. Equations 1-4 may be rearranged, for example, as follows:

$$B_x \cdot A_y - B_y \cdot A_x = B_{xy} \cdot A_{xy} \cdot \sin(T-M) \tag{5}$$

$$B_x \cdot A_x + B_y \cdot A_y = -B_{xy} \cdot A_{xy} \cdot \cos(T-M) \tag{6}$$

Equations 5 and 6 may be combined, for example, as follows to obtain the toolface offset (T−M):

$$(T-M) = \tan^{-1}\left[\frac{(B_x \cdot A_{yx} - B_y \cdot A_x)}{(-B_x \cdot A_x - B_y \cdot A_y)}\right] \tag{7}$$

which as illustrated in FIG. 4 is the direction of the transverse component $B_{xy}$ with respect to the highside (HS) of the wellbore. The magnitude of the transverse component $B_{xy}$ may be obtained, for example, from one of the following equations:

$$B_{xy} = \sqrt{(B_x^2 + B_y^2)} \tag{8}$$

$$B_{xy} = \sqrt{2 \cdot \sigma(B_x) \cdot \sigma(B_y)} \tag{9}$$

where $\sigma(B_x)$ and $\sigma(B_y)$ represent the standard deviations of $B_x$ and $B_y$. Note that both the magnitude $B_{xy}$ and direction (T–M) of the transverse field given in Equations 7, 8, and 9 are invariant under drill string rotation.

Accelerometer measurements made while rotating (particularly while drilling) are generally noisy owing to vibration of the drill string. Therefore, it may be advantageous to average the transverse accelerometer measurements over a time period such as several seconds in order to obtain an accurate measure of the toolface offset. Since the transverse accelerometer measurements vary with rotation it is desirable to compute an average toolface offset, for example, as follows:

$$(T - M) = \tan^{-1}\left[\frac{\sum (B_x \cdot A_y - B_y \cdot A_x)}{\sum (-B_x \cdot A_x - B_y \cdot A_y)}\right] \tag{10}$$

where $\Sigma(\bullet)$ represents a summation of a number of accelerometer and magnetometer measurements (acquired over a period of time). In an embodiment in which the accelerometer and magnetometer measurements are acquired at 10 millisecond intervals, the measurements may be advantageously summed (averaged) over a time interval in a range from about 1 to about 300 seconds (e.g., about 30 seconds). The magnitude of the transverse component $B_{xy}$ may be similarly averaged.

Figure 5:
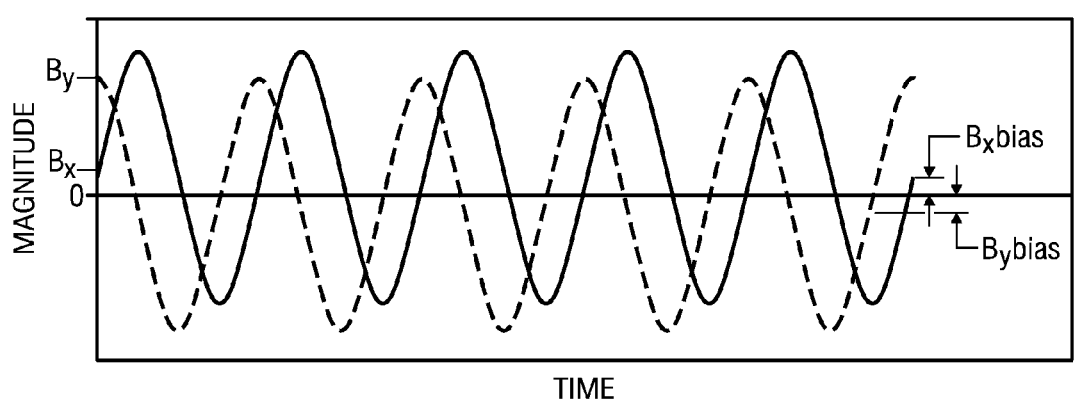
FIG. 5 depicts a plot of the transverse magnetometer outputs $B_x$ and $B_y$ as a function of time.

Turning to FIG. 5, the transverse magnetometer outputs may be plotted with time as the measurement tool rotates in the drilling well. As described above with respect to Equations 3 and 4, $B_x$ and $B_y$ vary sinusoidally with an amplitude equal to the magnitude of the transverse component $B_{xy}$. Moreover, as also depicted, the mean value for each sensor is equal to the sensor bias (over an integer number of periods). The mean values acquired during rotation may therefore enable the sensor biases to be removed (e.g., subtracted) prior to other processing. Upon removing the $B_x$ and $B_y$ biases, the toolface offset computed using Equation 9 is unaffected by transverse accelerometer bias (e.g., due to centripetal acceleration during rotation). Alternatively, the transverse accelerometer biases may be similarly removed in which case the toolface offset obtained via Equation 10 is unaffected by transverse magnetometer biases.

The transverse magnetic field may alternatively and/or additionally be expressed in terms of high side BHS and right side BRS components, for example, as follows:

$$BHS = B_{xy} \cdot \cos(T-M) \tag{11}$$

$$BRS = B_{xy} \cdot \sin(T-M) \tag{12}$$

The axial magnetic field measurement and the axial acceleration component (measured by the $B_z$ magnetometer and the $A_z$ accelerometer) may also be averaged as described above for the transverse measurements (e.g., over the same time interval). In embodiments utilizing a near-bit sensor sub (as depicted on FIG. 2) the axial magnetometer measurements may be contaminated by remanent and induced magnetic interference from nearby ferromagnetic drilling tool components. Such magnetic interference may be removed, for example, as described in U.S. Patent Publication 2013/0069655 (which is incorporated by reference in its entirety herein).

Based on the foregoing discussion, the three-dimensional magnetic field measured while rotating may be transformed from a tool based x/y/z coordinate system to a rotation invariant high side/right side/axial coordinate system. Alternatively, the three-dimensional magnetic field measured while rotating may be expressed as the magnitude of the transverse component $B_{xy}$, the toolface offset angle (T–M), and the magnitude of the axial component $B_z$. The three components of the rotation invariant magnetic field vector (e.g., BHS, BRS, and $B_z$) may be computed downhole as described above and transmitted to the surface using conventional telemetry techniques (e.g., via mud pulse or mud siren telemetry techniques). It may also be advantageous to transmit either the axial accelerometer measurement $A_z$ or the borehole inclination Inc, which may be computed from the axial accelerometer measurement, for example, as follows:

$$Inc = \cos^{-1}\left(\frac{A_z}{G}\right) \tag{13}$$

where G represents the local gravitational field of the Earth which may be determined from an external source or from the tri-axial accelerometer array during times in which the sensor sub is not rotating.

In certain embodiments the measured transverse magnetic field components may be perturbed by rotation of the drill string which can produce eddy currents in the electrically conductive collar. Such phenomenon has been disclosed, for example, in U.S. Pat. No. 5,012,412. In order to compensate for the effect of rotation induced eddy currents, it may also be desirable to transmit to the rotary speed (the rotation rate) of the sensor sub to the surface. The rotary speed rpm may be found, for example, as follows:

$$\text{rpm} = \frac{60 \text{ s}}{(2\pi N)} \sum_{i=1}^{N} [\text{mod}(M_i - M_{i-1} + \pi, 2\pi) - \pi] \tag{14}$$

where the summation is over N samples acquired at s per second (e.g., 3000 samples acquired at 100 samples per second) and $M_i$ represents the magnetic tool face of the $i^{th}$ sample.

Since the error in the direction of the transverse magnetic component caused by the conductive collar is approximately proportional to rotary speed, it may be represented by a fixed time delay between the accelerometer and magnetometer measurements. The effect may therefore be corrected by shifting the acquisition times for one set of sensors (either the accelerometers or magnetometers). This may be accomplished, for example, through the use of appropriate filters which delay the accelerometer signals with respect to the magnetometer signals. The methodologies disclosed in U.S. Pat. No. 7,650,269 and U.S. Patent Publications 2007/0203651 and 2010/0250207 may also optionally be employed to address any transverse magnetic field perturbations due to eddy currents in the drill collar.

The magnetic field components measured downhole represent the sum of the local Earth's magnetic field and the field from the target (as well as any magnetic interference from the drill string—which may be removed as described above). In order to obtain the target field from which magnetic ranging calculations are made, it may be necessary to remove the Earth's field components from the measured field. This may be represented mathematically, for example, as follows:

$$\vec{B}_T = \vec{B}_m - \vec{B}_e \quad (15)$$

where $\vec{B}_T$ represents the target magnetic field vector, $\vec{B}_m$ represents the measured magnetic field vector, and $\vec{B}_e$ represents the Earth's magnetic field vector. It will be understood that computing the target field vector may require that the measured magnetic field vector and the Earth's magnetic field vector be transformed into the same coordinate system (e.g., the rotation invariant system described above).

The magnetic field of the Earth (including both magnitude and direction components) is typically known, for example, from previous geological survey data or a geomagnetic model. However, for some applications it may be advantageous to measure the magnetic field in real time on site at a location substantially free from magnetic interference, e.g., at the surface of the well or in a previously drilled well. Measurement of the magnetic field in real time is generally advantageous in that it accounts for time dependent variations in the Earth's magnetic field, e.g., as caused by solar winds. However, at certain sites, such as an offshore drilling rig, measurement of the Earth's magnetic field in real time may not be practical. In such instances, it may be preferable to utilize previous geological survey data in combination with suitable interpolation and/or mathematical modeling (i.e., computer modeling) routines. Those of ordinary skill in the art will readily be able to transform the Earth's field to the above described high side/right side/axial reference frame, for example, using measured borehole inclination and borehole azimuth values.

Magnetic Ranging to a DC Target

The disclosed magnetic ranging embodiments may be utilized with a magnetic target including substantially any suitable DC magnetization. For example, the target well may include a magnetized casing string. The casing string may be intentionally magnetized so as to impart a known magnetic pattern to the string, for example, as disclosed in U.S. Pat. Nos. 7,538,650, 7,656,161, and 8,026,722, each of which is incorporated by reference herein in its entirety. In one embodiment commonly used in SAGD operations, the casing string may be magnetized such that each tubular in a premagnetized region of the casing includes a single pair of magnetically opposing poles (NN or SS) located at the approximate midpoint of the tubular. In this embodiment, the pairs of opposing poles are spaced at intervals about equal to the length of the tubulars, while the period of the magnetic field pattern (e.g., the distance from one a NN pair of opposing poles to the next) is about twice the length of the tubular.

Figure 6:
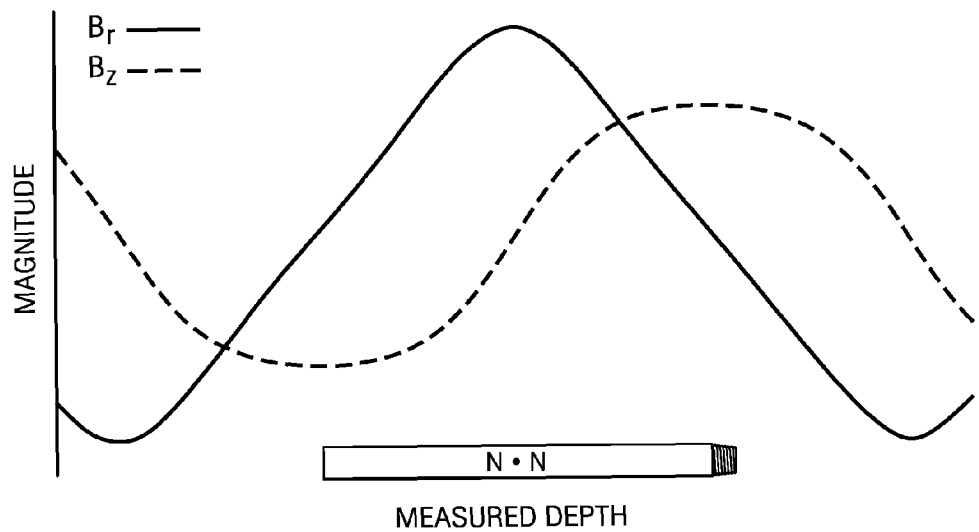
FIG. 6 depicts an example plot of the radial $B_r$ and axial $B_z$ magnetic fields as a function of measured depth for an example target well including a premagnetized casing string.

When ranging to a target including premagnetized casing (also referred to as remanent magnetism), the magnetic field of the Earth $\vec{B}_e$ may be subtracted, for example, as described above with respect to Equation 15. Alternatively, periodic variations in the measured magnetic field along the length (axis) of the drilling well may be used to separate the Earth's field from the target field. FIG. 6 depicts a plot of radial $B_r$ and axial $B_z$ magnetic field components versus measured depth for an example target well having a casing string premagnetized as described above. The components $B_r$ and $B_z$ are equivalent to the measured values of and $B_{xy}$ when the drilling well is approximately parallel to the target well (e.g., within about 10 degrees of parallel).

In embodiments in which the drilling well is a sufficient distance from the target well (e.g., greater than about one third of the axial distance between adjacent NN and SS opposing magnetic poles) the axial component $B_z$ displays a single maximum or minimum between adjacent NN and SS poles. The maxima and minima of the axial component $B_z$ correspond to the midpoints between the NN and SS poles where the target produces essentially no transverse magnetic field. Thus the values of BHS and BRS at these points may be taken to define the transverse component of the Earth's field. Conversely, maxima and minima of the transverse components BHS and BRS correspond to points opposite the NN and SS poles where the target produces essentially no axial magnetic field. Thus the value of the axial component $B_z$ at these points may be taken to define the axial component of the Earth's field.

In embodiments in which the drilling well is closer to the target well (e.g., less than about one third of the axial distance between adjacent NN and SS opposing magnetic poles), the axial component $B_z$ may display multiple maxima and/or minima between adjacent NN and SS poles (e.g., two maxima and one minimum or two minima and one maximum. In such embodiments, the single maximum or single minimum about which the axial component is symmetrical corresponds to the midpoints between the NN and SS poles where the target produces essentially no transverse magnetic field. Thus the values of BHS and BRS at these points may be taken to define the transverse component of the Earth's field.

Upon removing the Earth's magnetic field, the distance to the target wellbore may be computed from the target magnetic field vector and the known pole strengths imparted to the target well. For example, the magnitude of the transverse component of the target magnetic field may be processed in combination with an empirical or theoretical model of the magnetic field about the target to compute the distance. Moreover, the high side and right side components of the target magnetic field may be processed to compute the distance and/or direction to the target well. U.S. Pat. No. 7,617,049, which is incorporated by reference herein in its entirety, discloses other suitable methods for computing the distance and/or direction between a drilling well and a target well using magnetic ranging measurements.

Figure 7:
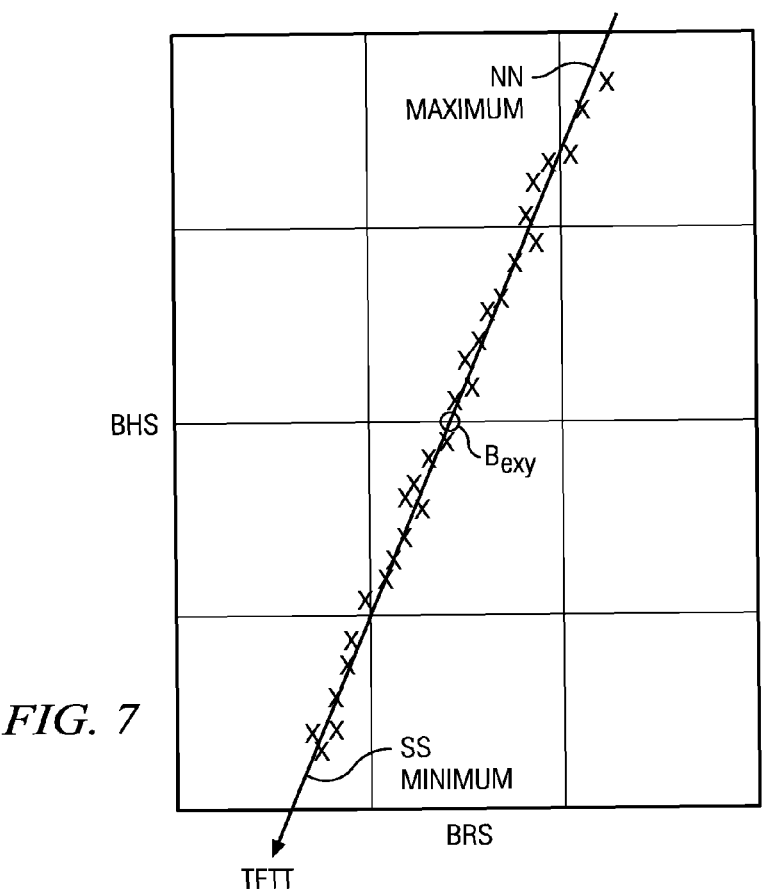
FIG. 7 depicts one example of a plot of the high side BHS versus right side BRS magnetic field components.

The direction in the transverse plane to the target well may alternatively and/or additionally be obtained via plotting the high side and right side components BHS and BRS of the measured magnetic field. FIG. 7 depicts a plot of the high side BHS versus right side BRS components of the measured magnetic field. The slope of the plot represents the tool face to target (TFT) direction (the direction to the target well in the transverse plane). The TFT may be determined in this way prior to removing the Earth's magnetic field from the measured magnetic field. FIG. 7 also depicts the maxima and minima of the transverse magnetic field component (the locations of the NN and SS poles). Moreover, the midpoint of the plot represents the transverse component of the Earth's magnetic field.

The casing string may include a residual remanent magnetism imparted during a magnetic particle inspection of the threaded ends of the casing tubulars. Magnetic ranging to such residual remanent magnetism is commonly referred to in the art as passive ranging. Such passive ranging can be challenging as the residual remanent magnetism tends to be highly localized at the ends of the casing tubulars, and consequently at the casing joints within the target wellbore. Moreover, the magnetic field strengths of the poles can be weak and unknown; therefore resulting in a magnetic field pattern that also tends to be unknown. Notwithstanding, magnetic ranging to target wells including residual remanent magnetism may be required, for example, when attempting to intercept the target well with a relief well, particularly when a close approach is used in a non-conductive formation such as salt, which tends to prevent the use of active ranging techniques.

Figure 8:
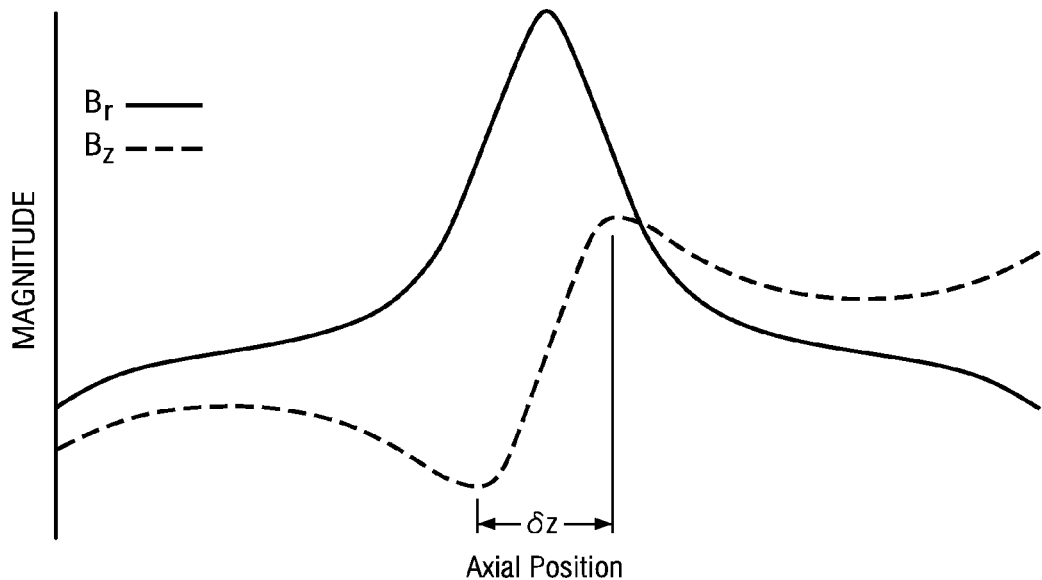
FIG. 8 depicts a plot of radial $B_r$ and axial $B_z$ magnetic fields verses axial position along the axis of target well having a residual remanent magnetism.

Owing to the relatively low magnitude of the target magnetic field, passive ranging is generally utilized at close distances (e.g., within five meters or less of the target). At close distances, each pole may present a signature such as that depicted on FIG. 8 (which is a plot of the radial and axial components of the measured magnetic field versus axial position along the target well). The axial distance $\delta z$ between opposing peaks (maxima and minima) of the axial component may be used to estimate the distance to the target. For example, the target magnetic field may be approximated to be emanating from a monopole located at the casing joint (this may be a reasonable assumption since the residual remanent magnetism tends to be highly localized at the ends of the casing tubulars). The axial component of the target field $B_{zt}$ may then be expressed mathematically, for example, as follows:

$$B_{zt} = \frac{P}{4\pi} \frac{z-z_0}{[d^2+(z-z_0)^2]^{1.5}} \quad (16)$$

where P represents the magnetic pole strength, d represents the radial distance to the target, z represents the axial position of the magnetic field sensor, and $z_0$ represents the axial position of the magnetic source (e.g., the joint between adjacent casing tubulars). Equation 16 may be differentiated with respect to the axial direction, for example, as follows:

$$\frac{dB_{zt}}{dz} = \frac{P}{4\pi} \frac{d^2-2(z-z_0)^2}{[d^2+(z-z_0)^2]^{2.5}} \quad (17)$$

The axial positions of the maximum and minimum may be obtained by setting Equation 17 to zero which yields $d^2=2(z-z_0)^2$. Assuming from FIG. 8 that $\delta z=2(z-z_0)$ yields the following expression for the distance between the drilling well and the target well:

$$d=\sqrt{2}(z-z_0)=\delta z/\sqrt{2} \quad (18)$$

It will be understood that the methodology described above with respect to Equations 16-18 and FIG. 8 does not necessarily require the Earth's magnetic field to be removed from the magnetic field measurements. The direction in the transverse plane to the target well may be obtained via plotting the high side and right side components BHS and BRS of the measured magnetic field as described above with respect to FIG. 7. Such processing may also be performed without removing the Earth's magnetic field from the measured magnetic field.

The target magnetic field may also be obtained by removing the Earth's magnetic field $\vec{B}_e$, for example, as describe above with respect to Equation 15. The target magnetic field may then be processed to compute the distance and/or the direction (e.g., the TFT) to the target well, for example, using the one or more of the techniques disclosed in U.S. Pat. No. 6,985,814, which is incorporated by reference herein in its entirety.

The target well may alternatively and/or additionally include a direct current (DC) electromagnetic source deployed therein. The electromagnetic source, such as a solenoid, may be moved along the axis of the target during the drilling operation and may further be controlled during drilling, for example, via switching the source on or off, varying its intensity, or reversing its polarity.

The target magnetic field may be found, for example, from the difference between measurements taken with the source excited in two different states such as two opposing polarities (e.g., positively and negatively directed current in the solenoid). The three components of the target magnetic field vector (BHS, BRS, and $B_z$ of the target) may be resolved into distance and direction by inversion of models or maps of the field around the target.

The Earth's field may be found from a measurement taken with the source switched off, or from the average of two measurements in which the source was excited with equal amplitude in two opposing polarities. Measurement of the Earth's field components in this way may be used to ascertain the attitude of the receiver by the use of standard relationships well known in magnetic wellbore surveying.

Magnetic Ranging to an AC Target

Figure 9:
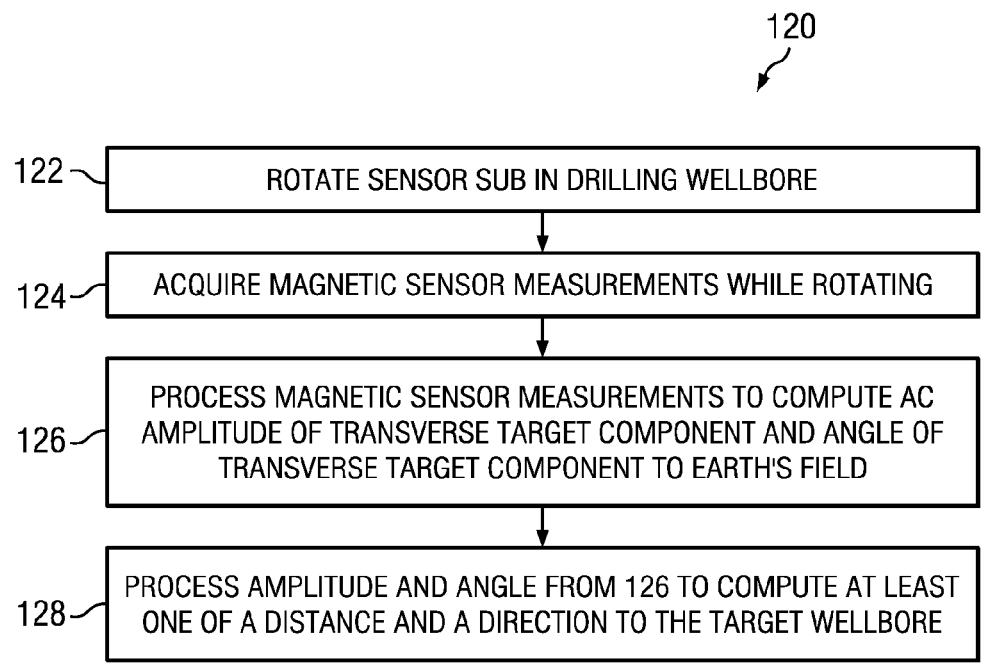
FIG. 9 depicts a flow chart of another disclosed method embodiment.

FIG. 9 depicts a flow chart of another disclosed method embodiment 120. A sensor sub including a magnetic field sensor (such as a tri-axial magnetometer set) is rotated in a drilling wellbore at 122 in sensory range of AC magnetic flux emanating from a target wellbore (note that the sensor sub may optionally, but does not necessarily, include accelerometers). Magnetic sensor measurements are acquired at 124 while rotating in 122 to obtain a magnetic field vector. The measured magnetic field vector is processed at 126 to compute at least one of (i) the amplitude of the transverse component of the AC magnetic flux emanating from the target wellbore and (ii) the angle between the transverse component of the AC magnetic flux emanating from the target wellbore and the transverse component of the Earth's magnetic field. The computed quantity (or quantities) may then be further processed at 128 to compute at least one of a distance and a direction from the drilling well to the target well.

The disclosed magnetic ranging embodiments may be utilized with a magnetic target including substantially any suitable AC magnetization. In such operations the target well may include an electromagnet powered by an alternating current (AC) power source. The magnetic field about an AC target $B_T$ may be expressed mathematically, for example, as follows:

$$B_T = B_{Ta} \sin(\omega t + \phi) \quad (19)$$

where $B_{Ta}$ represents the amplitude of the magnetic field, $\omega$ represents the known frequency, and $\phi$ represents an arbitrary phase. When in sensory range of the target, the axial (z-axis) magnetic field $B_z$ may be expressed as follows:

$$B_z = B_{ez} + B_{Tz} \quad (20)$$

where $B_{ez}$ represents the axial component of the Earth's field and $B_{Tz}$ represents the axial component of the target AC field. It will be understood from Equation 20 that the mean value (the DC value) of $B_z$ is equal to $B_{ez}$ and that the periodic variations from the mean may be used to compute the amplitude and phase of $B_{Tz}$. When magnetic field measurements are acquired over an interval of several cycles (preferably over an integer number of cycles—which may be readily achieved since the source frequency is known), the mean value of a set of measured $B_z$ measurements represents the axial component of the Earth's field. Thus, subtracting the mean value from each individual $B_z$ measurement gives the corresponding $B_{Tz}$. These operations may be expressed mathematically, for example, as follows:

$$B_{zm} = \frac{\Sigma B_z}{N} = B_{ez} \quad (21)$$

$$B_{Tz} = B_z - B_{zm} \quad (22)$$

where $B_{zm}$ represents the mean value of a set of $B_z$ measurements. The standard deviation of the set of $B_z$ measurements represents the root mean square (rms) amplitude of $B_{Tz}$. The amplitude $B_{za}$ of $B_z$ may thus be found by multiplying the root mean square value by the square root of two and the phase information $\sin(\omega t + \phi)$ may be found by dividing $B_{Tz}$ by $B_{za}$. These operations may be expressed mathematically, for example, as follows $$B_{Tzrms} = \sigma(B_z) \quad (23)$$

$$B_{za} = \sqrt{2} \, B_{Tzrms} \quad (24)$$

$$\sin(\omega t + \phi) = \frac{B_{Tz}}{B_{za}} \quad (25)$$

where $B_{Tzrms}$ represents the root mean square amplitude of $B_z$ and $\sigma(\cdot)$ represents the standard deviation. While Equations 19, 24 and 25 may imply that the target field $B_T$ is sinusoidal, the disclosed embodiments are expressly not limited in this regard. In practice the target field may deviate from a sine wave, as nonlinearity and hysteresis of ferromagnetic materials in the solenoid core and target casing may distort the waveform of the magnetic field (even when the input AC current is perfectly sinusoidal). The deviation of the magnetic field from a sine wave may be modeled or measured and suitable corrections made, if necessary.

Figure 10:
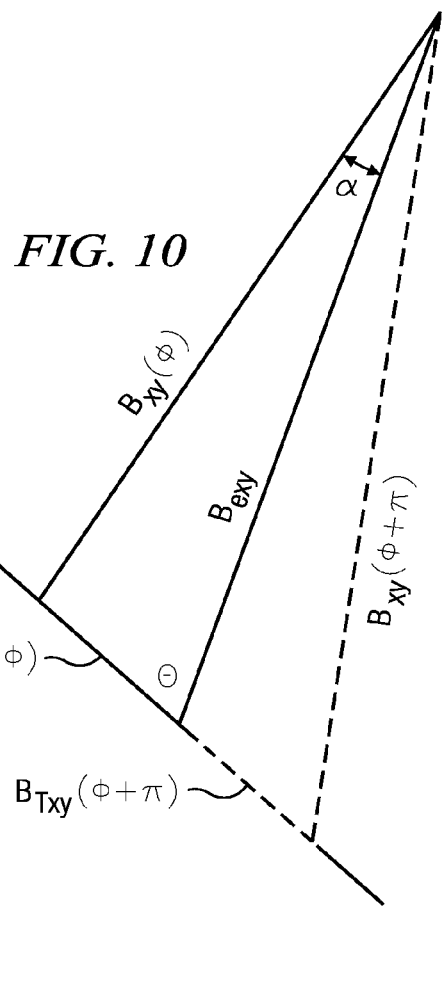
FIG. 10 depicts a schematic of the measured magnetic field including the Earth's field and target field in the transverse plane.

FIG. 10 depicts the transverse (xy) magnetic field vectors. Note that the transverse alternating magnetic field $\vec{B}_{xy}$ measured by the rotating x- and y-axis magnetic field sensors is the vector sum the transverse components of the Earth's magnetic field vector $\vec{B}_{exy}$ and the target well's magnetic field vector $\vec{B}_{Txy}$. The target field oscillates between positive and negative maxima $\vec{B}_{Txy}(\phi)$ and $\vec{B}_{Txy}(\phi+\pi)$ at a frequency $\omega$. As such the measured field also oscillates at a frequency $\omega$ (e.g., between $\vec{B}_{xy}(\phi)$ and $\vec{B}_{xy}(\phi+\pi)$ as indicated). The aforementioned vector sum of the transverse components may be expressed mathematically, for example, as follows:

$$\vec{B}_{xy}(\phi) = \vec{B}_{exy} + \vec{B}_{Txy}(\phi) \quad (26)$$

With continued reference to FIG. 10, the magnitude of the transverse component of the measured magnetic field $B_{xy}$ may be expressed mathematically, for example, as follows (using the law of cosines):

$$B_{xy} = \sqrt{(B_{exy}^2 + B_{Txy}^2 - 2B_{exy}B_{Txy}\cos\theta)} \quad (27)$$

where $B_{exy}$ represents the magnitude of the transverse component of the Earth's field, $B_{Txy}$ represents the magnitude of the transverse component of the target field, and $\theta$ represents the angle between the transverse components of the Earth's magnetic field vector and the target magnetic field vector. The direction of the transverse component of the measured magnetic field vector $B_{xy}$ diverges from the transverse component Earth's magnetic field vector $B_{exy}$ by the angle $\alpha$ where (using the law of sines):

$$\sin\alpha = \frac{B_{Txy} \cdot \sin\theta}{B_{xy}} \quad (28)$$

It will thus be understood that both the amplitude and direction of the measured transverse component oscillate with the target field, for example, as follows:

$$B_{Txy} = B_{Txya} \sin(\omega t + \phi) \quad (29)$$

where $B_{Txya}$ represents the amplitude of the transverse magnetic field from the target and where at any time t the corresponding value of $\sin(\omega t + \phi)$ may be obtained from the axial measurement (even when the magnetic field is non-sinusoidal). The magnitude of the transverse component of the measured magnetic field can be computed from the x- and y-axis magnetometer measurements (e.g., $B_{xy}^2 = B_x^2 + B_y^2$). Combining Equations 27 and 29 enables the magnitude of the transverse component of the measured magnetic field to be expressed as a quadratic function of the phase $\sin(\omega t + \phi)$, for example, as follows:

$$B_{xy}^2 = B_{Txya}^2 \sin^2(\omega t + \phi) - 2B_{xye}B_{Txya} \cos\theta \sin(\omega t + \phi) + B_{xye}^2 \quad (30)$$

Since $\sin(\omega t + \phi)$ is known at any instant in time from the axial magnetic field measurements (Equation 25), and since corresponding values of $B_{xy}$ are measured, a standard least-squares fit may be applied to determine the quadratic coefficients $B_{Txya}^2$, $2B_{xye}B_{Txya} \cos\theta$, and $B_{xye}^2$, from which $B_{Txya}$, $B_{exy}$, and $\theta$ may be determined. These parameters may then be used to obtain the distance and direction to the target well as described in more detail below.

The coefficients in a quadratic equation $y = a \cdot x^2 + b \cdot x + c$ may be found, for example, as follows when x and y are known:

$$\begin{vmatrix} a \\ b \\ c \end{vmatrix} = \begin{vmatrix} \Sigma x^4 & \Sigma x^3 & \Sigma x^2 \\ \Sigma x^3 & \Sigma x^2 & \Sigma x \\ \Sigma x^2 & \Sigma x & N \end{vmatrix}^{-1} \times \begin{vmatrix} \Sigma x^2 y \\ \Sigma xy \\ \Sigma y \end{vmatrix} \quad (31)$$

where $y = B_{xy}^2$, $x = \sin(\omega t + \phi)$, and $\Sigma(\cdot)$ indicates a sum over a predetermined number of measurements. For example, measurements may be acquired at 10 millisecond intervals for 30 seconds to obtain 3000 accelerometer and magnetometer measurements. In an embodiment in which the AC frequency is 10 Hz these measurements span 300 cycles.

It will be understood that the foregoing discussion has assumed that the AC magnetic field emanating from the target is substantially sinusoidal. However, the disclosed embodiments are not limited in this regard. In practice, when ranging to an AC solenoid, the received magnetic field may be non-sinusoidal. While the solenoid may be driven by a sinusoidal current, nonlinear behavior of ferromagnetic materials in the solenoid core and/or in the casing may cause the emitted AC magnetic field to be non-sinusoidal. In particular, the magnetic field may contain a third harmonic corresponding to a depression of the peak values resulting from material nonlinearity as magnetic saturation is approached.

A non-sinusoidal magnetic field may result in biased ranging results unless compensation is made. The waveform of the target magnetic field can be determined from the measured axial component, or from measurements of transverse components during intervals of non-rotation of the magnetic sensors. Corrections for harmonics (such as the above described third harmonic) may then be made by modeling their effect or by experiments conducted at the surface. Alternatively, the solenoid may be driven by a non-sinusoidal current whose waveform is adjusted to produce a sinusoidal magnetic field at the receiver. The waveform may be determined by modeling, by experiments conducted at the surface, or by feedback from real-time measurements of the received magnetic waveforms. The disclosed embodiments are not limited in this regard.

For example, a method for magnetic ranging may include deploying a magnetic field sensor in sensory range of magnetic flux emanating from a ferromagnetic casing string having an AC magnetic source deployed therein. The casing may be deployed at the surface or in a target well. Magnetic field measurements may be processed to compute an amplitude of at least one higher order harmonic of the AC magnetic field. The AC magnetic source may then be energized with a non-sinusoidal input electrical current to reduce (or eliminate) the amplitude of the higher order harmonic.

The above described magnetic ranging technique tends to be effective when the magnitude of $B_{xy}$ is a strong function of the target field; i.e., when the angle $\theta$ in FIG. 10 is small (e.g., less than about 45 degrees). This may be the case when drilling twin well pairs for SAGD applications in northern latitudes (where the magnetic dip angle is high). However, when the angle between these components is large (e.g., greater than about 45 degrees), the magnitude of $B_{xy}$ is less dependent on the target field and thus it may be beneficial to alternatively and/or additionally examine the oscillating direction $\alpha$. The direction $\alpha$ may be observed as a regular variation in apparent rotary speed calculated using x- and y-axis magnetometers.

Figure 11:
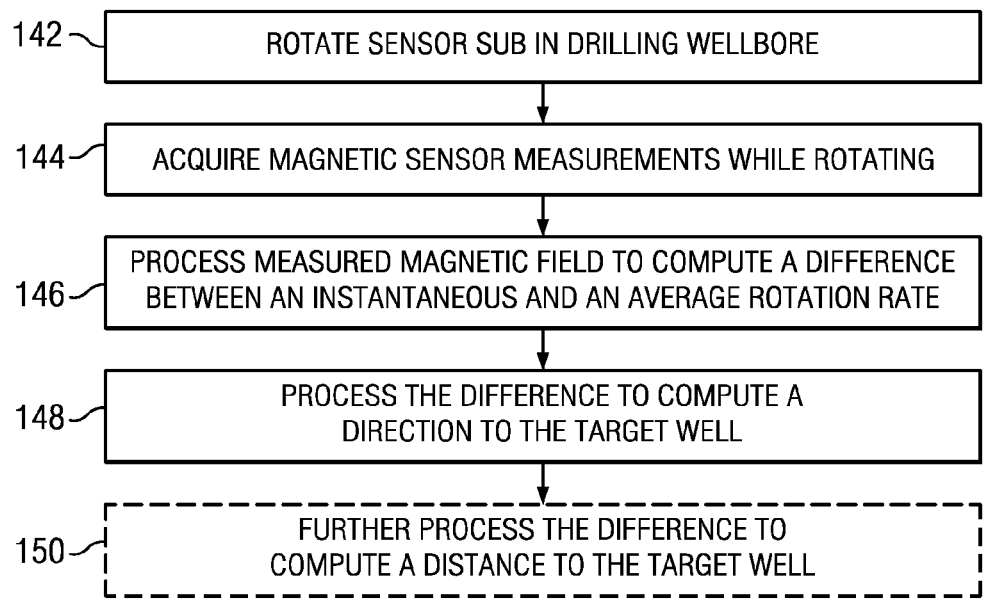
FIG. 11 depicts a flow chart of yet another disclosed method embodiment.

FIG. 11 depicts a flow chart of yet another disclosed method embodiment 140. A sensor sub including a magnetic field sensor (such as a tri-axial magnetometer set) is rotated in a drilling wellbore at 142 in sensory range of AC magnetic flux emanating from a target wellbore (note that the sensor sub may optionally, but does not necessarily include accelerometers). Magnetic sensor measurements are acquired at 144 while rotating in 142 to obtain a magnetic field vector. The measured magnetic field vector is processed at 146 to compute a difference between an instantaneous rotation rate and an average rotation rate of the sensor sub. The computed difference is processed at 148 to compute a direction from the drilling well to the target well. The difference may be optionally further processed at 150 to compute a distance to the target well.

At each instant (i.e., at each magnetometer measurement interval—such as 10 millisecond), an apparent magnetic toolface may be computed, for example, as described above with respect to FIG. 2 ($M = \tan^{-1}(B_x/B_y)$). The instantaneous rotary speed $rpm_t$ may be computed from the difference between successive toolface values, for example, as follows:

$$rpm_t = \frac{60 \text{ s}}{(2\pi)}[\text{mod}(M_t - M_{t-1} + \pi, 2\pi) - \pi] \quad (32)$$

where s represents the magnetometer sample rate (measurement interval). It will be understood that the magnetic toolface M is measured with respect to the transverse component of the measured magnetic field (i.e., $\vec{B}_{xy}$). As described above with respect to FIG. 10, the direction of $\vec{B}_{xy}$ is offset from the transverse component of the Earth's magnetic field $\vec{B}_{exy}$ by the angle $\alpha$ which varies at frequency $\omega$. Thus, the calculated instantaneous rotary speed is directly affected by the rate of change of the reference direction, which may be expressed mathematically, for example, as follows:

$$rpm_t = rpmavg - \frac{60 \text{ s}}{(2\pi)} \cdot \frac{\partial \alpha}{\partial t} \quad (33)$$

where rpmavg represents the average rotary speed determined, for example, via Equation 14 and $\partial\alpha/\partial t$ represents the rate of change of the angle $\alpha$ which may be evaluated by applying the law of sines to the diagram on FIG. 10, for example, as follows:

$$\frac{\sin\alpha}{B_{Txy}} = \frac{\sin(\theta + \alpha)}{B_{exy}} \quad (34)$$

from which it follows that:

$$\tan\alpha = \frac{B_{Txy}\sin\theta}{B_{exy} - B_{Txy}\cos\theta} \quad (35)$$

Differentiating Equation 35 yields:

$$\frac{\partial \alpha}{\partial t} = \frac{\partial \alpha}{\partial B_{Txy}} \frac{\partial B_{Txy}}{\partial t} = \frac{B_{exy}B_{Txya} \cdot \omega\cos(\omega t + \phi)\sin\theta}{(B_{exy}^2 + B_{Txy}^2 - 2B_{exy}B_{Txy}\cos\theta)} \quad (36)$$

From Equation 33 the deviation of the measured rotary speed from the average rotary speed $\Delta$rpm may be given as follows:

$$\Delta\text{rpm} = -\frac{60}{(2\pi)} \cdot \frac{\partial \alpha}{\partial t} \quad (37)$$

Substituting Equation 36 into Equation 37 yields:

$$\Delta\text{rpm} = -\frac{60}{(2\pi)} \cdot \frac{B_{exy}B_{Txya} \cdot \omega\cos(\omega t + \phi)\sin\theta}{B_{exy}^2 + B_{Txy}^2 - 2B_{exy}B_{Txy}\cos\theta} \quad (38)$$

In many magnetic ranging operations to an AC target, it may be assumed that the Earth's field $B_{exy}$ is much larger than the target field $B_{Txya}$ such that Equation 37 may be simplified, for example, as follows:

$$\Delta\text{rpm} \approx -\frac{60}{(2\pi)} \cdot \frac{B_{Txya} \cdot \sin\theta}{B_{exy}}\omega\cos(\omega t + \phi) \quad (39)$$

Note that in Equation 39 the deviation (or variation) in the measured rotary speed Δrpm is sinusoidal (proportional to $\cos(\omega t+\phi)$) at the AC excitation frequency $\omega$ with an amplitude equal to $B_{Txya} \cdot \sin\theta / B_{exy}$. The amplitude is proportional $B_{Txya}$ and may thus be related to the distance from the drilling well to the target well (e.g., using one or more of the above described methods). Moreover, the Earth's field $B_{exy}$ may be known from other measurements.

In many ranging operations employing an AC target, it may be advantageous to employ both of the above described methodologies (the first based on the magnitude of $B_{xy}$ described with respect to Equations 27-30 and the second based on the oscillating direction described with respect to Equations 31-38). For example, the first methodology may be employed to obtain values of $B_{Txya}$ and $\theta$ while the second methodology may be employed to obtain the sign (positive or negative) of $\sin\theta$ which indicates whether the target is to the right or left of the drilling well. Alternatively, both methodologies may be employed simultaneously to provide a more robust solution for $B_{Txya}$ and $\theta$ (i.e., a solution having reduced noise).

The three components of the AC target magnetic field ($B_{Txya}$, $\theta$, and $B_{za}$ of the target) may be resolved into distance and direction by inversion of models or maps of the field around the target. For example, the amplitude of the transverse component of the target field $B_{Txya}$ may be resolved into distance using an empirical or theoretical model or map of the target field and the angle $\theta$ between the Earth's field and the target field may be resolved into a toolface to target direction, for example, as follows:

$$TFT=\theta+(T-M) \quad (40)$$

where TFT represents the toolface to target direction in the transverse plane and (T−M) represents the above described toolface offset that may be measured, for example, using Equation 9 at times when the AC target is not energized.

It will be understood that while not shown in FIGS. 1 and 2, downhole measurement tools suitable for use with the disclosed embodiments generally include at least one electronic controller. Such a controller may include signal processing circuitry including a digital processor (a microprocessor), an analog to digital converter, and processor readable memory. The controller may also include processor-readable or computer-readable program code embodying logic, including instructions for computing various parameters as described above, for example, with respect to the disclosed mathematical equations. One skilled in the art will also readily recognize some of the above mentioned equations may also be solved using hardware mechanisms (e.g., including analog or digital circuits).

A suitable controller may include a timer including, for example, an incrementing counter, a decrementing time-out counter, or a real-time clock. The controller may further include multiple data storage devices, various sensors, other controllable components, a power supply, and the like. The controller may also optionally communicate with other instruments in the drill string, such as telemetry systems that communicate with the surface or an EM (electro-magnetic) shorthop that enables the two-way communication across a downhole motor. It will be appreciated that the controller is not necessarily located in the sensor sub (e.g., sub 60), but may be disposed elsewhere in the drill string in electronic communication therewith. Moreover, one skilled in the art will readily recognize that the multiple functions described above may be distributed among a number of electronic devices (controllers).

Although magnetic ranging while rotating and certain advantages thereof have been described in detail, it should be understood that various changes, substitutions and alternations can be made herein without departing from the spirit and scope of the disclosure as defined by the appended claims.

What is claimed is:

1. A method for magnetic ranging comprising:
 (a) rotating a downhole drilling tool in a drilling well in sensory range of magnetic flux emanating from a target well having an AC magnetic source deployed therein, the downhole drilling tool including a magnetic field sensor rotatably coupled to the downhole drilling tool;
 (b) causing the magnetic field sensor to measure a magnetic field vector while rotating in (a);
 (c) processing the magnetic field vector measured in (b) to compute a magnetic quantity including an amplitude of a transverse component of the magnetic flux emanating from the target well and an angle between the transverse component of the magnetic flux emanating from the target well and a transverse component of Earth's magnetic field; and
 (d) processing the magnetic quantity computed in (c) to compute at least one of a distance and a direction from the drilling well to the target well.

2. The method of claim 1, wherein the magnetic field sensor comprises a tri-axial set of magnetometers and the downhole drilling tool further comprises a tri-axial set of accelerometers.

3. The method of claim 1, wherein the quantity computed in (c) is transmitted to a surface location and the processing in (d) is performed at the surface location.

4. The method of claim 1, wherein:
 the processing in (d) comprises processing the amplitude and the angle computed in (c) to compute the distance and the direction from the drilling well to the target well.

5. The method of claim 4, wherein (d) comprises (i) acquiring a model that relates the amplitude of a transverse component of the magnetic flux emanating from the target well and an angle between the transverse component of the magnetic flux emanating from the target well and a transverse component of Earth's magnetic field to a distance and a direction between the drilling well and the target well, and (ii) processing the amplitude and the angle computed in (c) in combination with the model acquired in (i) to determine at least one of the distance and the direction from the drilling well to the target well.

6. The method of claim 1, wherein the processing in (d) further comprises processing an axial component of the magnetic field vector and the magnetic quantity computed in (c) to compute at least one of a distance and a direction from the drilling well to the target well.

7. The method of claim 1, wherein the processing in (c) further comprises:
 (i) processing a transverse component of the magnetic field vector measured in (b) to compute the amplitude of the transverse component of the magnetic field vector;
 (ii) processing an axial component of the magnetic field vector measured in (b) to compute the phase of the magnetic flux emanating from the target well; and
 (iii) processing the amplitude and the phase computed in (i) and (ii) to compute the amplitude of the transverse component of the magnetic flux emanating from the target well and the angle between the transverse component of the magnetic flux emanating from the target well and the transverse component of Earth's magnetic field.

8. The method of claim 7, wherein the phase of the magnetic flux emanating from a target well is computed in (ii) using the following mathematical equation:

$$\sin(\omega t + \phi) = \frac{(B_z - B_{zm})}{\sqrt{2}\,\sigma(B_z)}$$

wherein $\sin(\omega t=\phi)$ represents the phase, $B_{zm}$ represents a mean value of a set of axial magnetic field measurements, $\sigma(B_z)$ represents a standard deviation of the set of axial magnetic field measurements, and $B_z$ represents the axial component of the magnetic field vector.

9. The method of claim 7, wherein the amplitude of the transverse component of the magnetic field vector is computed in (i) using at least one of the following mathematical equations:

$$B_{xy} = \sqrt{B_x^2 + B_y^2}$$

$$B_{xy} = \sqrt{2 \cdot \sigma(B_x) \cdot \sigma(B_y)}$$

wherein $B_{xy}$ represents the amplitude of the transverse component of the magnetic field vector, $B_x$ and $B_y$ represent the transverse component of the magnetic field vector measured in (b), $\sigma(B_x)$ and $\sigma(B_y)$ and represent standard deviations of corresponding sets of $B_x$ and $B_y$ measurements.

10. The method of claim 7, wherein (iii) further comprises processing the amplitude and the phase computed in (i) and (ii) such that the amplitude is expressed as a quadratic function of the phase to compute the amplitude of the transverse component of the magnetic flux emanating from the target well and the angle between the transverse component of the magnetic flux emanating from the target well and the transverse component of Earth's magnetic field.

11. The method of claim 10, wherein the quadratic function is expressed mathematically as follows:

$$B_{xy}^2 = B_{Txya}^2 \sin^2(\omega t+\phi) - 2B_{xys}B_{Txya}\cos\theta\sin(\omega t+\phi) + B_{xye}^2$$

wherein $B_{xy}$ and $\sin(\omega t+\phi)$ represent the amplitude and the phase computed in (i), represents the amplitude of the transverse component of the magnetic flux emanating from the target well, $\theta$ represents the angle between the transverse component of the magnetic flux emanating from the target well and the transverse component of Earth's magnetic field, and $B_{xye}$ represents the transverse component of Earth's magnetic field.

12. The method of claim 1, wherein (c) further comprises processing the magnetic field vector measured in (b) to compute the transverse component of Earth's magnetic field.

13. The method of claim 1, wherein the direction from the drilling well to the target well is a toolface to target angle computed using the following mathematical equation:

$$TFT = \theta + (T-M)$$

wherein TFT represents the toolface to target angle, $\theta$ represents the angle computed in (c), and (T−M) represents a toolface offset in which T represents a gravity toolface and M represents a magnetic toolface.

14. A method for magnetic ranging comprising:
(a) rotating a downhole drilling tool in a drilling well in sensory range of magnetic flux emanating from a target well having an AC magnetic source deployed therein, the downhole drilling tool including a magnetic field sensor rotatably coupled to the downhole drilling tool;
(b) causing magnetic field sensor to measure a magnetic field vector while rotating in (a);
(c) processing the magnetic field vector measured in (b) to compute a difference between an instantaneous rotation rate and an average rotation rate of the downhole drilling tool; and
(d) processing the difference computed in (c) to compute a direction from the drilling well to the target well.

15. The method of claim 14, wherein the magnetic field sensor comprises a tri-axial set of magnetometers and the downhole drilling tool further comprises a tri-axial set of accelerometers.

16. The method of claim 14, wherein the difference computed in (c) is transmitted to a surface location and the processing in (d) is performed at the surface location.

17. The method of claim 14, wherein the processing in (d) comprises processing a sign of the difference computed in (c) to compute the direction from the drilling well to the target well.

18. The method of claim 14, wherein (d) further comprises processing the difference computed in (c) to compute a distance and a direction from the drilling well to the target well.

19. The method of claim 18, wherein (d) further comprises (i) acquiring a model that relates an amplitude of the difference computed in (c) to the distance from the drilling well to the target well, and (ii) processing the amplitude in combination with the model acquired in (i) to determine the distance from the drilling well to the target well.

20. The method of claim 14, wherein the difference Δrpm is processed in (d) using the following mathematical equation $$\Delta \text{rpm} \approx -\frac{60}{(2\pi)} \cdot \frac{B_{Txya} \cdot \sin\theta}{B_{exy}} \omega\cos(\omega t + \phi)$$

wherein $B_{Txya}$ represents the amplitude of the transverse component of the magnetic flux emanating from the target well, $\theta$ represents the angle between the transverse component of the magnetic flux emanating from the target well, the transverse component of Earth's magnetic field, and $B_{xys}$ represents the transverse component of Earth's magnetic field, and $\omega$ represents a frequency of the AC magnetic source.

21. A method for magnetic ranging comprising:
(a) rotating a downhole drilling tool in a drilling well in sensory range of magnetic flux emanating from a target well having an AC magnetic source deployed therein, the downhole drilling tool including a magnetic field sensor rotatably coupled to the downhole drilling tool;
(b) causing the magnetic field sensor to measure a magnetic field vector while rotating in (a); and
(c) processing the magnetic field vector measured in (b) to compute at least one of a distance and a direction from a drilling well to a target well,
wherein the processing in (c) comprises (i) processing the magnetic field vector measured in (b) to compute an amplitude of a transverse component of the magnetic field vector and (ii) processing the amplitude to compute the distance from the drilling well to the target well, and wherein the amplitude of the transverse component of the magnetic field vector is computed in (i) using at least one of the following mathematical equations:

$$B_{xy} = \sqrt{(B_x^2 + B_y^2)}$$

$$B_{xy} = \sqrt{2 \cdot \sigma(B_x) \cdot \sigma(B_y)}$$

wherein $B_{xy}$ represents the amplitude of the transverse component of the magnetic field vector, $B_x$ and $B_y$ represent the transverse component of the magnetic field vector measured in (b), and $\sigma(B_x)$ and $\sigma(B_y)$ represent standard deviations of corresponding sets of $B_x$ and $B_y$ measurements.

22. A method for magnetic ranging comprising:
(a) deploying a magnetic field sensor in sensory range of magnetic flux emanating from a ferromagnetic casing string having an AC magnetic source deployed therein;
(b) causing the magnetic field sensor to measure an AC magnetic field emanating from the casing string;
(c) processing the magnetic field measured in (b) to compute an amplitude of at least one higher order harmonic; and
(d) energizing the AC magnetic source with a non-sinusoidal input electrical current to reduce the amplitude of the higher order harmonic.

23. The method of claim 22, wherein the ferromagnetic casing string and the AC magnetic source are deployed in a target well and the magnetic field sensor is deployed in a drilling well.

24. The method of claim 23, wherein the magnetic field sensor is rotating in the drilling well when the AC magnetic field is measured in (b).

\* \* \* \* \*